United States Patent [19]

Edblad et al.

[11] Patent Number: 5,327,468
[45] Date of Patent: Jul. 5, 1994

[54] SYNCHRONIZATION OF TIME-OF-DAY CLOCKS IN A DISTRIBUTED PROCESSING NETWORK SYSTEM

[75] Inventors: Warren A. Edblad, Plum Boro; Albert W. Crew, Monroeville; Carl J. Staab, Murrysville, all of Pa.

[73] Assignee: Westinghouse Electric Corp., Pittsburgh, Pa.

[21] Appl. No.: 901,446

[22] Filed: Jun. 19, 1992

[51] Int. Cl.$^5$ .......................... H04L 7/00; H04J 3/22; H04J 3/12
[52] U.S. Cl. ................................ 375/107; 370/85.15; 370/105
[58] Field of Search ............ 375/107, 108, 106; 370/85.5, 100.1, 103, 105, 85.15; 455/51.1, 56.1

[56] References Cited

U.S. PATENT DOCUMENTS

| | | | |
|---|---|---|---|
| 4,144,414 | 3/1979 | Nicholas | 179/15 BS |
| 4,411,007 | 10/1983 | Rodman et al. | 375/107 |
| 4,500,989 | 2/1985 | Dahod | 370/85 |
| 4,607,257 | 8/1986 | Noguchi | 370/104 |
| 4,736,393 | 4/1988 | Grimes et al. | 375/107 |
| 4,807,259 | 2/1989 | Yamanaka et al. | 375/107 |
| 4,815,110 | 3/1989 | Benson et al. | 375/107 |
| 5,001,730 | 3/1991 | Franaszek et al. | 375/107 |
| 5,146,585 | 9/1992 | Smith, III | 375/108 |

Primary Examiner—Stephen Chin
Assistant Examiner—Amanda T. Le
Attorney, Agent, or Firm—P. C. Watkins

[57] ABSTRACT

The operating system clocks in each station on a counter rotating ring network of a distributed processing system are synchronized by latching the count in a free running counter in the network interface of each station at the instant a clock message transmitted by a timekeeper station is received. The timekeeper station then calculates from its operating system time-of-day clock and its free running counter, its time of reception of the clock message, and broadcasts this timekeeper time of reception to the other stations. Each other station calculates its own time of reception from its operating system time of day, and the count in its free running counter, and uses the difference between its time of reception and the timekeeper time of reception to correct its operating system time-of-day clock. Repeater and media propagation delays determined from the dynamic topography of the network are taken into account in calculating the correction factor. The free running counter can also be used to maintain a higher resolution local time of day than is available from the operating system time-of-day clock.

10 Claims, 5 Drawing Sheets

SYNCHRONIZATION OF TIME-OF-DAY CLOCKS IN A DISTRIBUTED PROCESSING NETWORK SYSTEM

BACKGROUND OF INVENTION

This invention relates to synchronization of time-of-day clocks maintained in each station of a distributed processing network system, and in particular to such a system in which there are significant time delays which can vary dynamically. The invention further relates to providing a higher resolution time-of-day clock than is available from the time-of-day clocks typically found in station processors.

BACKGROUND INFORMATION

In a distributed processing system, and in particular a distributed control system, one of the more difficult tasks is the maintenance of a distributed synchronous time-of-day clock. The clock forms the time standard required in all stations to permit the scheduling of distributed tasks and to accurately tag the occurrence of various events (for sequence of events logging throughout the network). Control conditions in a typical present day control system require the worst case deviation between any two stations to be less than 200 microseconds. Thus, the resolution of each clock must be 100 microseconds and the accuracy of each clock must be plus or minus 100 microseconds.

The simplest solution is to have one station periodically transmit a message which contains she correct time of day. Upon reception of the message, all stations would set their clocks to the value specified in the message. Unfortunately, there are many significant and variable delays between the time when the message is constructed and the time the clocks are set in the remote stations. These delays include: processing time in the sending computer, queue delays waiting for transmission, processing time in the source network interface, delays waiting for access to the media, transmission time, media propagation delays, station repeater delays, processing time in the destination network interface, queuing delays in the destination computer, and software processing delays. These delays and their variability, prevent synchronization to the desired accuracy.

The above analysis assumes the use of the time-of-day clock maintained by the operating system in a processor in each station. The effects of many of the described delays can be eliminated by adding special hardware to the network interfaces at both the transmitting and receiving stations. Specifically, the hardware at the transmitting station would read the local time-of-day clock at the instant of transmission and insert the value into the message. This would eliminate the error caused by the following delays: processing time in the sending computer; queue delays waiting for transmission, processing time in the source network interface and the delays waiting for access to the media. Hardware at the receiving station would detect the clock message, extract the time of day, and set the local time-of-day clock. This would eliminate the error caused by the following: processing time in the destination network interface, queuing delays in the destination computer, and software processing delays. The only remaining errors are associated with the transmission time, she media propagation delays, and station repeater delays. Unfortunately, the special hardware to perform the above functions is rather complex. Since any station must be able to assume the timekeeper function, all stations would be required to have both special pieces of hardware.

U.S. Pat. No. 4,815,110, suggests another system for synchronizing the time-of-day clocks in a distributed processing system. The time synchronization process is divided into two phases. During the first phase, the timekeeper station transmits a special message on the network. At the instant the message is received, the hardware at each station latches (i.e., saves) the value of its local time-of-day clock. During the second phase, the timekeeper station transmits a message containing the value of its time-of-day clock which was saved when it received its own message during phase one. When the timekeeper time-of-day is received at each other station, the received value is subtracted from the saved value. The resulting value represents the difference between the local clock and the timekeeper's station clock and is used to correct the local clock. The hardware required for this process is much simpler than that discussed above, and the transmission time error is eliminated. The required hardware includes only a hardware counter used to represent the local time of day and circuitry to recognize the clock message during phase one. However, the counter must support the following operations: read, set, and latch. Additionally, the value in the counter must represent absolute time.

In a similar system developed by the assignee of the present invention, a single master station sends the special timing message in phase one to all stations, and in phase two, three stations, the master station and two additional stations, send the times they received the special timing signal to all the stations. Each station then averages the two closest time-of-day signals received and corrects to that average.

In some networks, such as the FDDI (fiber distribution data interface) counter-rotating ring network, messages are passed from station to stations by repeaters in the network interfaces of each station in the ring. This repeater function introduces a time delay, such as for example, about 750 nanoseconds. In addition, the communications medium connecting the stations introduces additional delays. Furthermore, the FDDI network can restructure the network topography through selection of clockwise and counter-clockwise fiber sections between stations to accommodate for outages. These changes in topography will effect the delay experienced by one or more stations in the network.

Another problem is that many of the present day workstations have operating system time-of-day clocks which do not have the resolution required to meet the requirements of many distributed processing system applications.

SUMMARY OF THE INVENTION

It is an object of the present invention to provide improved means for synchronizing station time-of-day clocks in a distributed processing system.

It is another object of the invention to achieve this primary object with minimum specialized hardware.

It is an additional object of the invention to achieve the previous objects utilizing each station's operating system time-of-day clock, and to do so even when the operating system time-of-day clock does not have the resolution demanded by the network system.

It is also an object of the invention to provide such an improved means for synchronizing station time-of-day clocks which accommodates for network delays and for dynamic changes in the network delays, such as would accompany changes in network topography.

These and other objects are realized by the invention which is directed to a distributed processing system with means for synchronization of station time-of-day clocks which includes in each station a free-running counter in the network interface which maintains a count of time intervals. It further includes means within a designated timekeeper station periodically generating a timing signal which is transmitted over the data communications network to all of the stations including the timekeeper station. Means in each network interface latches the count in the free-running counter upon receipt of the timing signal. The timekeeper station further includes means transmitting to all the stations the timekeeper time-of-day signal representing the time of day that the time the timekeeper station received the timing signal. Each of the other stations include means determining a station reference time of day from the latched count, and the count in the free-running counter, and from the time of day in the operating system time-of-day clock at the time of receipt of the timekeeper time-of-day signal. Each station further includes means determining the difference between the station reference time of day and the received timekeeper time of day and adjusting the time of day clock in the operating system based on this difference.

Additional stations are equipped to be timekeeper stations and assume the timekeeper function sequentially if they do not receive the timing signal within a respective assigned interval.

Each of the stations takes into account delays introduced both by the repeater function of the network interfaces and the communications media delays in calculating the station reference time. These calculations also take into account changes in the cumulative delays resulting from changes in network topography.

The invention further provides improved resolution in the station time-of-day clock reading where the station operating system time-of-day clock does not have the resolution required by the application. The station operating system time-of-day clocks have a software counter which is indexed by a clock interrupt. In accordance with the invention, current time-of-day reading means multiplies the time of day in this software counter by the ratio of the resolution of the free-running counter in the network interface to the software counter resolution to generate a high resolution product. The change in the count in the free-running counter generated since the last clock interrupt is added to this product to obtain the current high resolution time of day. In one embodiment of this aspect of the invention, the free-running counter has a modulus equal to a unit of time in the software counter and the clock interrupt is generated each time the free-running counter rolls over so that the change in the count in the free-running counter since the last interrupt is merely the current count.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a distributed data processing network system implemented with an FDDI (fiber distributed data interchange) network, although it will be appreciated by those skilled in the art that the invention has application to such systems implemented by other types of networks.

Figure 1:
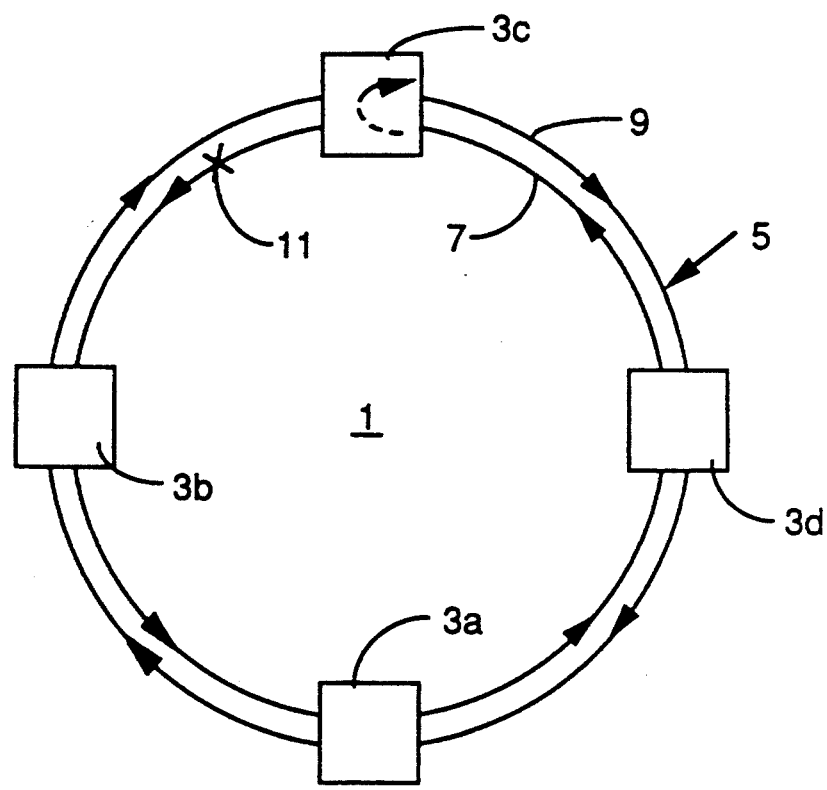
FIG. 1 is a schematic diagram of a distributed processing network system incorporating the invention.

FIG. 1 illustrates a distributed processing network system 1 having a plurality of stations 3a-d. The four stations of the system 1 are exemplary only, and any number of stations may be included in the system 1. The stations 3a-d are connected by a network 5 in a dual ring configuration with one ring 7 transmitting messages in a counterclockwise direction, and a second ring 9 transmitting messages in a clockwise direction.

In the preferred form of the invention, the FDDI network standard is used. In such a network, the two rings 7 and 9 include optic fibers for the communications media. In other networks, coaxial cable or a twisted wire pair could be used for the communications media. The FDDI network has an open network architecture. The FDDI network includes a station management standard, which among other things, controls the configuration of the network. Under normal conditions, when the station 3 transmits a message, the message is carried by one of the rings to each station in sequence which repeats the message for the next station. Thus, if the inner ring 7 is being used and the station 3a transmits a message, the station 3d receives the message and repeats it for station 3c which in turn repeats the message for station 3b. If station 3a is withdrawn from the system, or a fault occurs in the ring such as shown at 11 in FIG. 1, station management reconfigures the network to assure that all the remaining active stations receive transmitted messages. Thus, with the break in the ring at 11 when the message originated by the station 3a reaches the station 3c, the transmission is looped back on the outer ring 9 through the stations 3d and 3a to the station 3b.

The repeat function performed by each of the stations in relaying received messages requires a finite time. For example, in the exemplary system about 750 nanoseconds. In addition, there are delays introduced by the communications media forming the rings 7 and 9. In the fiber optic media of the FDDI network, this delay is typically about 5 to 6 microseconds per kilometer. In a distributed processing system extending over several kilometers, the cumulative delays can be appreciable, especially in the instance set forth above where the message is looped back through stations which repeat the message twice.

Figure 2:
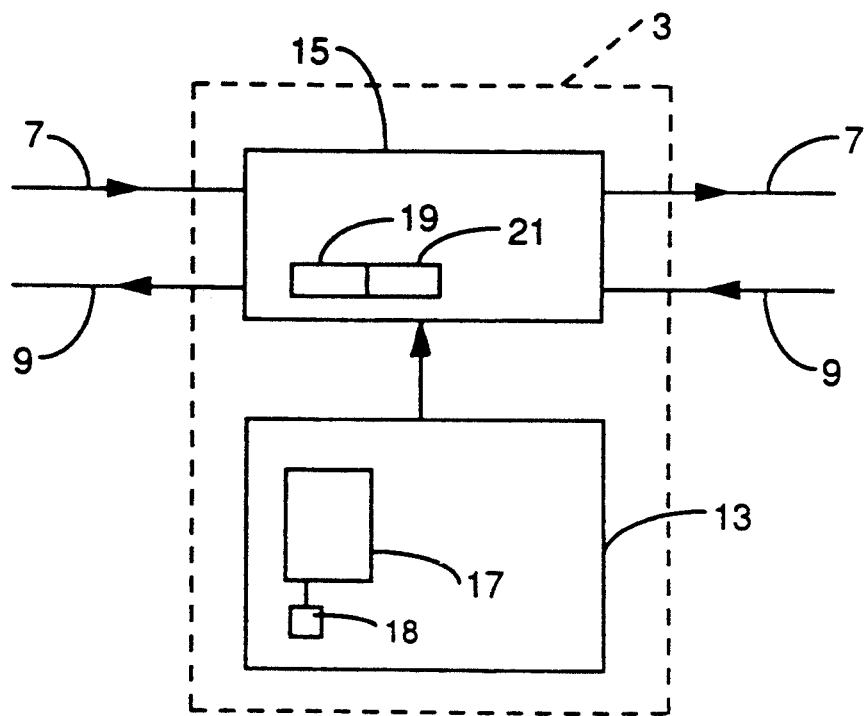
FIG. 2 is a schematic diagram of one of the plurality of stations which forms part of the system of FIG. 1.

The stations 3 in a distributed control system can include distributed processing units and workstations 13 connected to the rings 7 and 9 of the network 5 through a network interface 15 as shown in FIG. 2. The distributed processing units and workstations 13 all include a processor 17. The distributed processing units performed the control functions of the system 1. Typically, this comprises regulating a particular system variable to a set point value. The workstation serve as man-machine interfaces through which an operator controls and monitors the distributed processing system 1. Coordination of the functions of the various stations in the system 1 require the interchange of real time data. The FDDI standard provides for synchronous and asynchronous modes for the transmission of data. The synchronous mode is utilized for transmitting the real time data by the periodic repetition of the current values of various parameters in the system. As mentioned previously, this requires synchronization of the time-of-day clocks maintained in the processor 17 in each of the stations. Control conditions in a typical present-date control system require a worst case deviation of less than 200 microseconds between station clocks.

The present invention achieves use synchronization between station clocks with the required accuracy by providing in each network interface a free running counter 19 with a latch 21. The free running counter does not represent absolute time and therefore never has to be reset. The counter 19 should be wide enough that it does not roll over too often and the software must be able to handle such rollovers.

In accordance with the invention, one of the stations is designated as the timekeeper station. This station periodically transmits a timing signal over the network 5 to each of the other stations. At the instant this timing signal is received, the count in the free-running counter 19 is saved in the latch 21. The timekeeper station then sends out a timekeeper time-of-day message representing the time of day that it received the timing message to all of the other stations. This timekeeper time-of-day value must be calculated since the free-running counter value does not represent absolute time. This is done by reading the operating system time-of-day clock in the processor 17 and the free-running counter 19. Typically, the processor 17 has an interrupt generator 18 which periodically generates interrupts used to increment the operating system time-of-day clock. The difference between the current value of the free-running counter 19 and the values saved in the latch 21 at the moment of reception of the timing signal is multiplied by the period of the counts recorded by the free running counter. The resulting value is the amount of time which has elapsed since the timing signal was received by the timekeeper station. This time is subtracted from the operating system time-of-day clock value which was just read. The result is the time-of-day at the instant the clock was received by the timekeeper station. This value is placed in the timekeeper time of day message and transmitted over the network 5 to the other stations.

When the timekeeper time of day signal is received as each other station 3, the station first calculates a reference value for its time-of-day clock. It uses the same calculations as the timekeeper station did. The received time keeper time of day is then subtracted from the calculated station reference time of day. The resulting value represents the difference between the local clock and a timekeeper station's clock and is used to correct the local time-of-day clock. This correction can be achieved by setting the operating system clock, gradually adjusting it, or by saving a local correction term which is added to or subtracted from the local clock value when an accurate value is required.

The clock synchronization procedure described thus far ignores delays in passing the timing signal around the network. The magnitude of the resulting error depends on the type of network used. As discussed above, in a ring network, such as the exemplary FDDI network, the two major contributions to the delay are the station delay in repeating the message of each node (up to 750 nanoseconds per station) and the signal propagation delay in the media (about five microseconds per kilometer for fiber optic cable). The software which is performing the clock synchronization function needs to correct the clock value received from the timekeeper station to compensate for the transmission delay between the local station and the timekeeper station. This compensation is based upon known cable lengths and the current network configuration. Clock synchronization must be temporarily suspended when the network reconfigures. Clock synchronization is resumed when the topology of the network has been established. As mentioned the station management level of the FDDI network determines the current topology of the network.

If the timekeeper station fails, or is removed from the network, another station must take over the function. This is accomplished by assigning each station a unique time interval. If the station does not receive the timing signal within that time interval, it will become the timekeeper station and transmit the timing signal. The various stations assume the timekeeper function sequentially based upon the assigned unique timing intervals.

Figure 3:
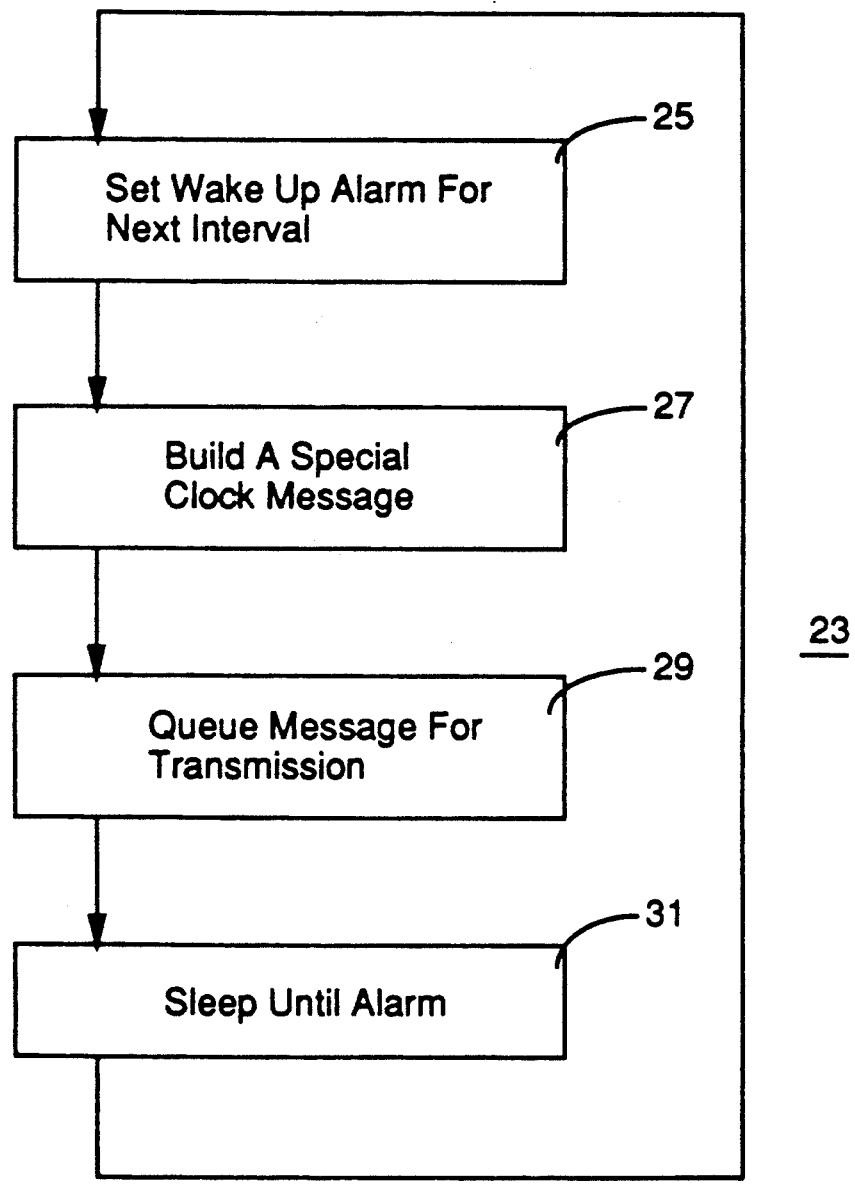
FIGS. 3-7 are flow charts of suitable computer programs implementing the invention in the distributed processing network system of FIGS. 1 and 2.
Figure 4:
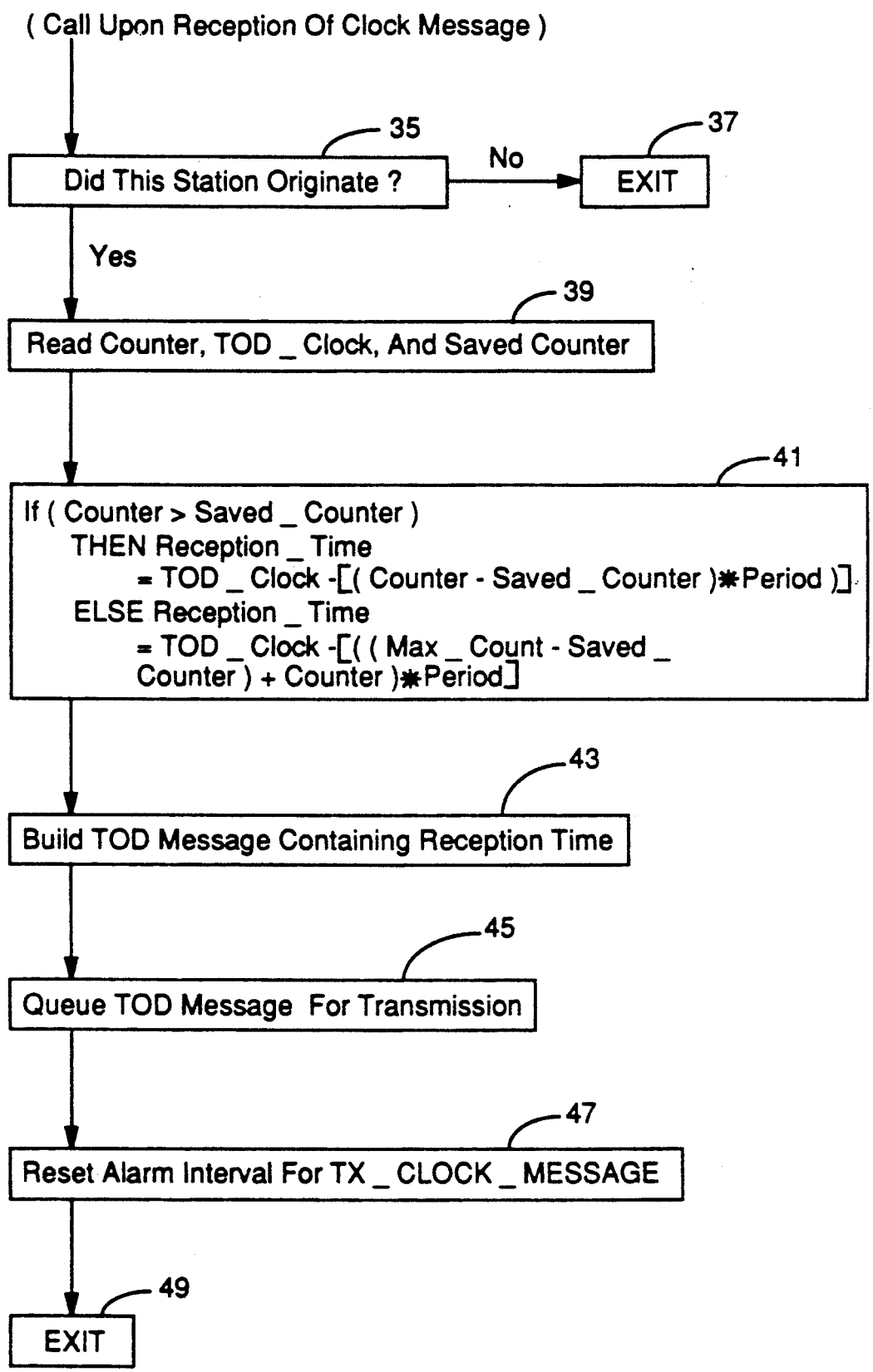
Figure 5:
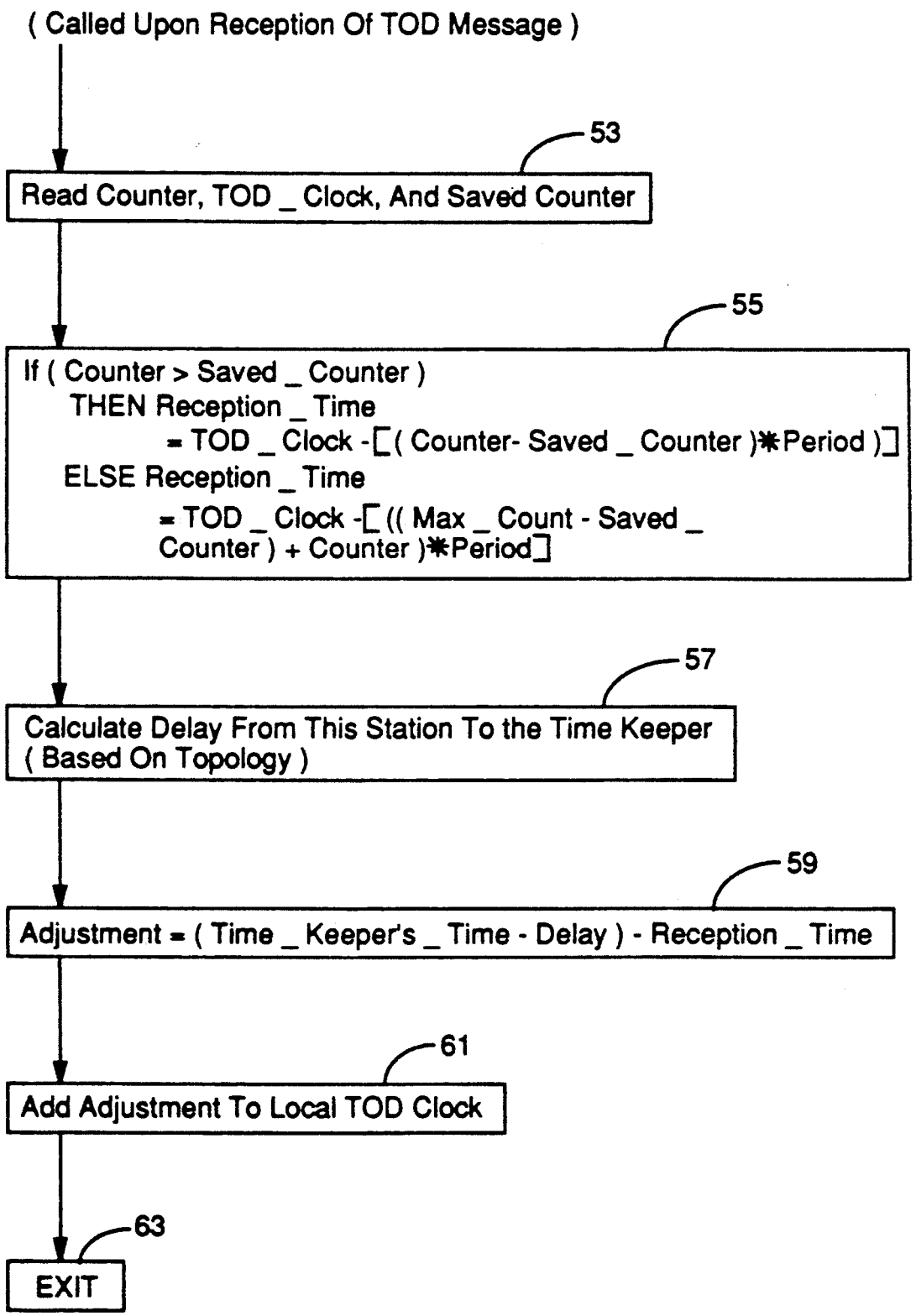

FIG. 3-5 illustrate flow charts for three routines which implement synchronization of the network time-of-day clocks using the free-running counter. FIG. 3 illustrates the flow chart for a TX_CLOCK_MESSAGE routine utilized by the timekeeper station to periodically transmit the timing signal. The routine 23 begins by setting a wake up alarm for the next interval at 25. It then generates at 27 a clock message containing a timing signal as discussed above. The message is queued for transmission at 29, and then the routine waits for the next alarm at 31.

FIG. 4 illustrates an RX_CLOCK_MESSAGE routine run in response to receipt of the timing signal. While there is only one timekeeper station at any given time, the routine is run by all of the stations since any station can assume the timekeeper function. The routine begins at 35 by determining if the station is the current timekeeper station. If not, the routine is exit at 37. If it is the timekeeper station, it reads at 39 the current count in the free-running counter, the current time in the station processor operating system time-of-day clock and the count saved in the latch 21.

If the current count in the free-running counter is greater than the latched count, then the reception time of the timing signal is calculated by subtracting from the current time-of-day in the time-of-day clock, the difference between the current count in the free-running counter and the latched count multiplied by the period of the free-running counter. However, if the current count in the free-running counter is less than the latched count, indicating that the free-running counter has rolled over, the reception time is calculated at 41 by subtracting the latched count from the maximum count of the free-running counter, adding the current count in the free-running counter and multiplying by the period of the free-running counter. The resulting value is then subtracted from the current operating system time-of-day clock value. The timekeeper station then generates a timekeeper time-of-day message containing the timekeeper time-of-day signal at 43. This time-of-day message is queued for transmission at 45 and an alarm interval for the routine is reset at 47 before the routine is exited at 49.

FIG. 5 illustrates an RX_TIME_OF_DAY routine which is run by each of the stations upon the receipt of the time-of-day message containing the timekeeper time of day. The routine begins by reading at 53 the current values of the free-running counter and the operating system time-of-day clock, and also the latched count. A reception time is then calculated at 55 using the same calculations as in block 43 of the routine shown in FIG. 4. The network delay from this station to the timekeeper station is then calculated at 57 based upon the network topology. That is, the repeater delay for each of the intermediate stations is added to the total delay for the length of communications media between the timekeeper station and local station for the path taken by the message. An adjustment is then calculated at 59 by first subtracting the network delay from the timekeeper's time of delay and then subtracting the reception time calculated in 55. This adjustment is then used to adjust the local time-of-day clock at 61 before the routine is exited at 63.

The typical operating system clocks have a resolution of +/−10 milliseconds. As discussed above, this is not adequate for most time synchronization requirements. In accordance with another aspect of the invention, the free-running counter 19 in the network interface of a station is combined with the operating system clock in the station processor to form a high resolution time-of-day clock. Typically, the operating system in the processors 17 keeps track of the time of day by means of a periodic interrupt. This interrupt is generated by the hardware. When this interrupt occurs, the operating system typically increments a software counter. The counter measures elapsed time since a fixed point in time. The units associated with the counter usually match the resolution of the time-of-day clock, e.g., 10 milliseconds. In accordance with one embodiment of this aspect of the invention, the free-running counter 19 in the network interface is designed to have a modulus, that is a maximum time value, equal to the desired interrupt rate. Rollover of the free-running counter is then used to provide the interrupt for the operating system time-of-day clock. A high resolution count representing the elapsed time since a fixed point in time is then calculated by multiplying the count in the software counter by the ratio of the hardware resolution to the software resolution and then adding the value of the free-running counter. This high resolution time-of-day value can then be used in place of the operating system time-of-day clock in the previously described synchronization procedures. It should be noted that the time correction would most likely be achieved by storing a correction term, since the free-running counter is not settable.

In another embodiment of this aspect of the invention, the operating system time-of-day clock generates the clock interrupts as usual. However, the interrupt service routine is modified to read and save the value of the free-running counter at the instant of the time-of-day interrupt. The high resolution count representing the elapsed time sensed a fixed point in time is then calculated by multiplying the count in the software counter by the ratio of the hardware resolution to the software resolution and adding the difference between the current value of the free running counter and the value saved when the time-of-day interrupt occurred. As described in the time synchronization above, the difference calculation must be able to handle a rollover of the counter.

Figure 6:
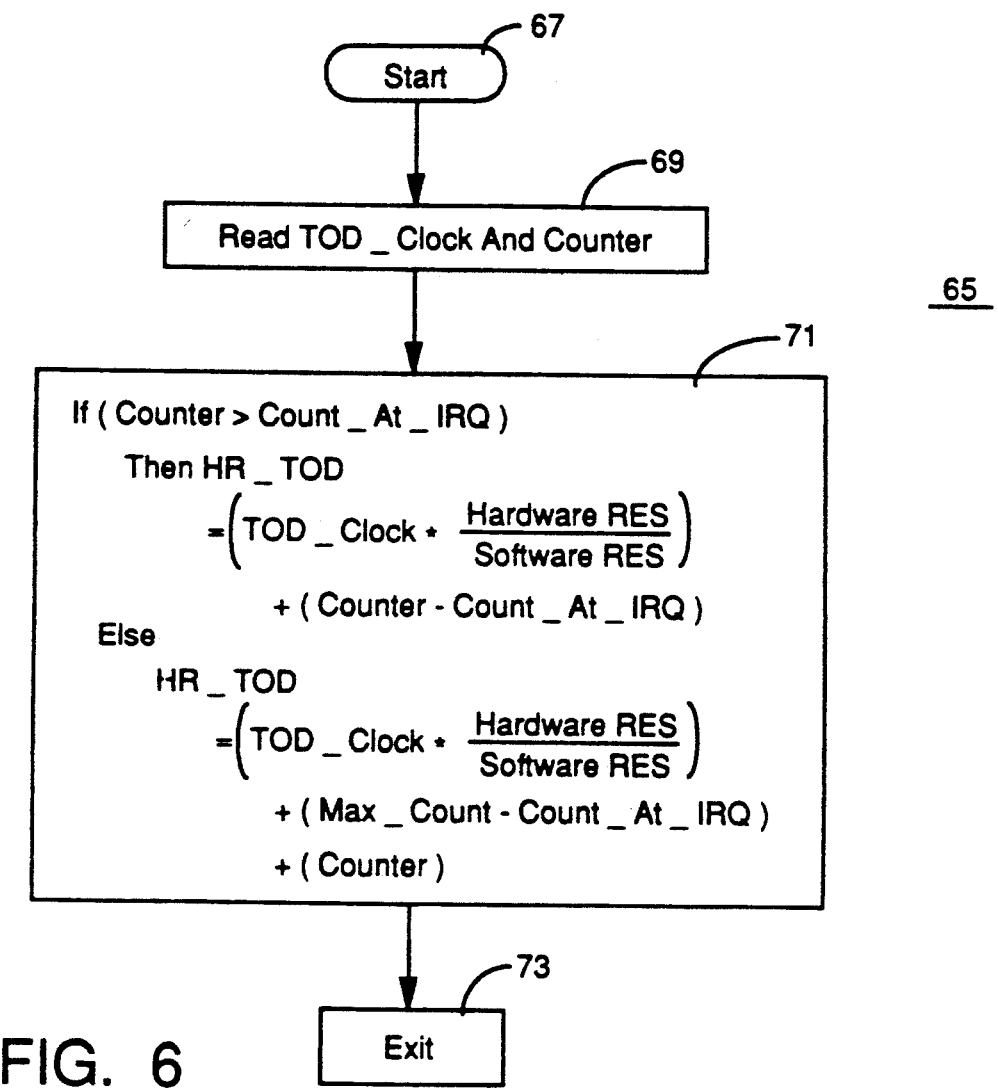

FIG. 6 illustrates a flow chart for a computer program 65 run by the processors 17 in the stations 3 that generates the high resolution time of day signal. When called at 67, the routine reads the software time-of-day clock and the count in the counter 19 at 69. The high resolution time of day is then calculated at 71 in accordance with the first formula if the counter 19 has not rolled over in accordance with the second formula when the counter has rolled over. The routine is then exited at 73.

Figure 7:
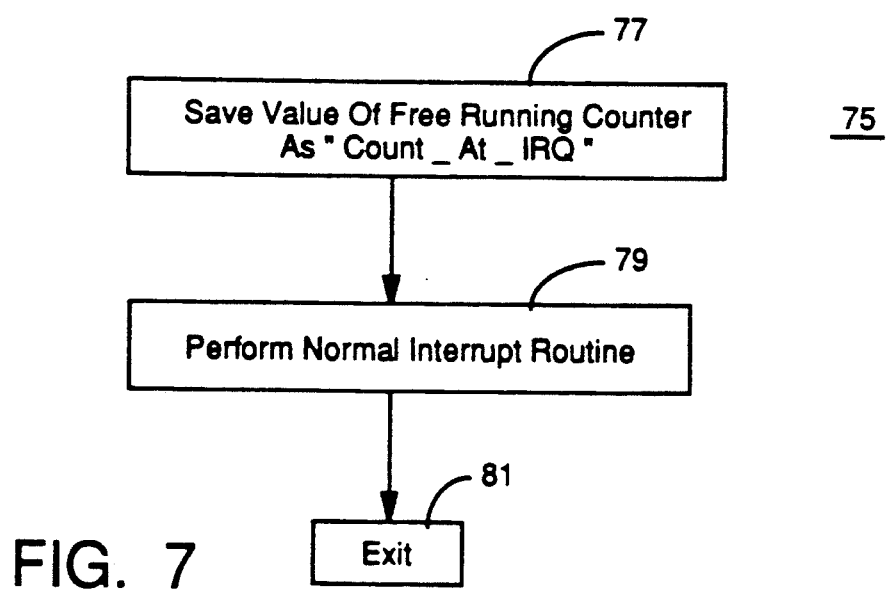

FIG. 7 illustrates a flow chart for the routine 75 run by the processor 17 in response to each clock interrupt. The routine saves the value of the free running counter 19 as the COUNT_AT_IRQ signal used in the routine 65.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A distributed processing system comprising:
   a plurality of stations each having a station processor with an operating system maintaining a station time-of-day clock and a network interface;
   a data communications network for connecting said plurality of stations through the network interfaces;
   synchronization means for synchronizing each of the station time-of-day clocks in each of the station processors;
   wherein said synchronization means includes:
   a free running counter in each network interface for maintaining a count of time intervals;
   latching means counter in each network interface for selectively storing said count;
   means within a designated timekeeper station for periodically generating a timing signal which is transmitted over said data communications network to all of said stations including said timekeeper station;
   means in each of the network interfaces for saving said count in the free running counter in said latching means upon receipt of said timing signal;
   means in said timekeeper station for subsequently transmitting over said data communications network to all of said stations a timekeeper time-of-day signal representing the time of day at the timekeeper station when said timing signal was received;
   means in said stations other than said timekeeper station for determining a station reference time of day from the latched count in the latching means, the count in the free running counter at the time of receipt of said timekeeper time-of-day signal and the time of day in the operating system time-of-day clock at the time of receipt of the timekeeper time-of-day signal; and
   means in each station for determining the difference between the station reference time of day and the received timekeeper time of day and adjusting said time-of-day clock in said operating system based upon said difference;

wherein said data communications network connects said stations in a counter rotating ring configuration with said network interfaces retransmitting said timing signal and timekeeper time-of-day signals around said ring with a predetermined time delay; and wherein said means for determining said station reference time of day takes into account said predetermined time delay for all network controllers between said station and the timekeeper station.

2. The combination of claim 1 wherein said timekeeper station includes means for generating said timekeeper time-of-day signal from the count latched in said latching means of its network interface upon receipt of the timing signal, a current count in the free running counter and a current time of day in the operating system time-of-day clock.

3. The combination of claim 1 wherein a second station becomes the timekeeper station and includes means for generating and transmitting said timing signal and timekeeper time-of-day signal when a timing signal is not received within a predetermined interval.

4. The combination of claim 1 wherein another one of several stations in sequence becomes the timekeeper station and each includes means for generating and transmitting said timing signal and timekeeper time-of-day signal when a timing signal is not received within a predetermined sequence of time intervals respectively for said several stations.

5. The combination of claim 1 wherein said means for determining said station reference time of day includes means for adjusting said station reference time of day for delays in transmission of said timing signal from said timekeeper station to said station.

6. The combination of claim 1 wherein said counter-rotating ring configuration of said data communications network has lengths of communications media between stations which introduce known time delays into transmission of said timing signal and timekeeper time-of-day signal, and wherein said means for determining said station reference signal further takes into account said known time delays for lengths of communications media between said station and the timekeeper station.

7. The combination of claim 6 including means for altering the counter-rotating ring configuration of said data communications network and wherein said means for determining said station reference signal takes into account changes in the number of network interfaces and the lengths of communications media between stations in determining the station reference time of day.

8. A distributed processing system comprising:
a plurality of stations each having a station processor with an operating system maintaining a station time-of-day clock, and a network interface;
a data communications network for connecting said plurality of stations through the network interfaces;
synchronization means for synchronizing each of the station time-of-day clocks in each of the station processors;

wherein said synchronization means includes:
a free running counter in each network interface for maintaining a count of time intervals;
latching means counter in each network interface for selectively storing said count;
means within a designated timekeeper station for periodically generating a timing signal which is transmitted over said data communications network to all of said stations including said timekeeper station;
means in each of the network interfaces for saving said count in the free running counter in said latching means upon receipt of said timing signal;
means in said timekeeper station for subsequently transmitting over said data communications network to all of said stations a timekeeper time-of-day signal representing the time of day at the timekeeper station when said timing signal was received;
means in said stations other than said timekeeper station for determining a station reference time of day from the latched count in the latching means, the count in the free running counter at the time of receipt of said timekeeper time-of-day signal and the time of day in the operating system time-of-day clock at the time of receipt of the timekeeper time-of-day signal; and
means in each station for determining the difference between the station reference time of day and the received timekeeper time of day and adjusting said time-of-day clock in said operating system based upon said difference;
wherein said time-of-day clock maintained by at least one station processor has a software counter indexed by a clock interrupt with a lower resolution than resolution of the free running counter and including current time-of-day reading means for multiplying the time of day in said software counter by the ratio of the free running counter resolution to the software counter resolution to generate a high resolution product and adding to said product a change in the count in the free running counter from the last clock interrupt to obtain a current high resolution time of day.

9. The combination of claim 8 wherein said free running counter has a modulus equal to a unit of time in said software counter, said combination further including means for generating said clock interrupt each time said free running counter rolls over and wherein said current time of day reading means adds the count in the free running counter to said product as the change in the count from the last clock interrupt.

10. The combination of claim 8 including means for storing as a first count the count in the free running counter when said software counter is indexed by the clock interrupt, and wherein said current time-of-day reading means determines said change in the count in the free running counter by subtracting from a current count in the free running counter said first count.

* * * * *